Figure 1:
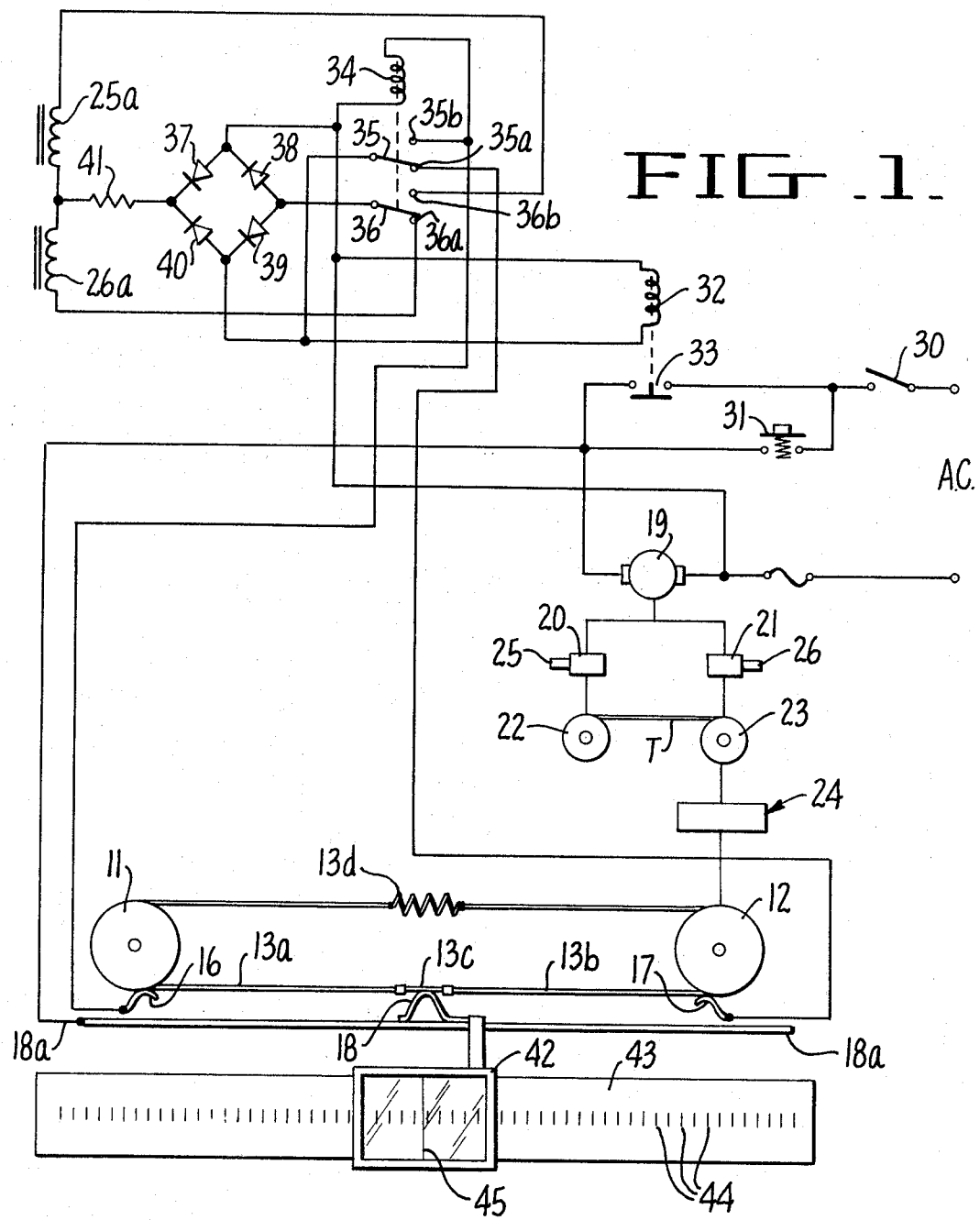

United States Patent [19]
Priest

[11] 3,850,384
[45] Nov. 26, 1974

[54] MECHANICAL ANALOG COMPUTER AND LENGTH MEASURING APPARATUS

[75] Inventor: Lyle Gilbert Priest, Palo Alto, Calif.

[73] Assignee: Information Design, Inc., Menlo Park, Calif.

[22] Filed: Oct. 24, 1972

[21] Appl. No.: 299,887

Related U.S. Application Data

[60] Division of Ser. No. , , and a continuation-in-part of Ser. No. 156,660, June 25, 1971, Pat. No. 3,710,221.

[52] U.S. Cl.................. 242/191, 242/57, 242/201, 200/61.14, 360/72
[51] Int. Cl.... B65h 59/38, G03b 1/02, G11b 15/13
[58] Field of Search................... 242/191, 201–210, 242/57; 33/127, 136; 200/61.13, 61.14; 360/71, 72

[56] References Cited
UNITED STATES PATENTS

| | | | |
|---|---|---|---|
| 2,832,841 | 4/1958 | Eldridge, Jr. | 360/72 |
| 3,608,846 | 9/1971 | Pieplow | 242/201 |
| 3,643,895 | 2/1972 | Atsumi | 242/201 |

*Primary Examiner*—Leonard D. Christian

[57] ABSTRACT

An analog computer device comprising at least one spiral pulley and a flexible cord wound on the pulley, said device having particular utility in measuring the length of coiled materials, the spiral pulley being connected to a spool or drum of coiled material and the flexible cord being connected to an indicator or control device; whereby rotation of the spiral pulley positions the indicator or control device in linear relationship to the length or amount of material wound or unwound from the spool.

9 Claims, 3 Drawing Figures

MECHANICAL ANALOG COMPUTER AND LENGTH MEASURING APPARATUS

This application is a divisional application and a continuation-in-part of U.S. application Ser. No. 156,660 filed June 25, 1971, now U.S. Pat. No. 3,710,221.

This invention relates generally to analog computer devices of the mechanical type as may be used to linearize the movement of an indicator relative to the length of material wound or unwound on a spool by reference to the spool's rotation. The invention has particular application in the construction of machines for viewing microfilm wound on reels, as well as to length-measuring for coiled materials. The invention is described herein in connection with both applications.

In brief, this invention teaches an analog computer device comprised of at least one spiral pulley and a cord that moves an indicator in linear relationship to the length or displacement of material as it is wound and unwound upon a spool. While the spiral pulley is rotated in direct angular relationship to that of the spool such rotation is in non-linear relationship to the rate of material movement. The transformation of angular displacement of the spiral pulley and movement of the cord as a linear function of the material is accomplished by proper selection of the radial pitch of the spiral pulley, the gear ratio between the spiral pulley and the spool and the inside and outside pulley diameters. A proper selection is made on the basis of the thickness of the material measured and the number of turns required to wind one layer upon the spool, as is described herein in greater detail.

One object of the invention is to provide a mechanical analog computer device for moving an indicator in linear relationship to the movement of coiled material such as a tape.

Another object of the invention is to provide an analog computer device that is easily manufactured and at a relatively low cost and, therefore, has a wide variety of applications and uses.

Other objects of this invention will become apparent in view of the following detailed description.

Figure 2:
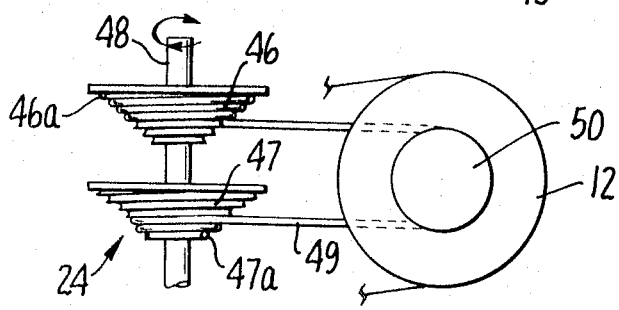
Figure 3:
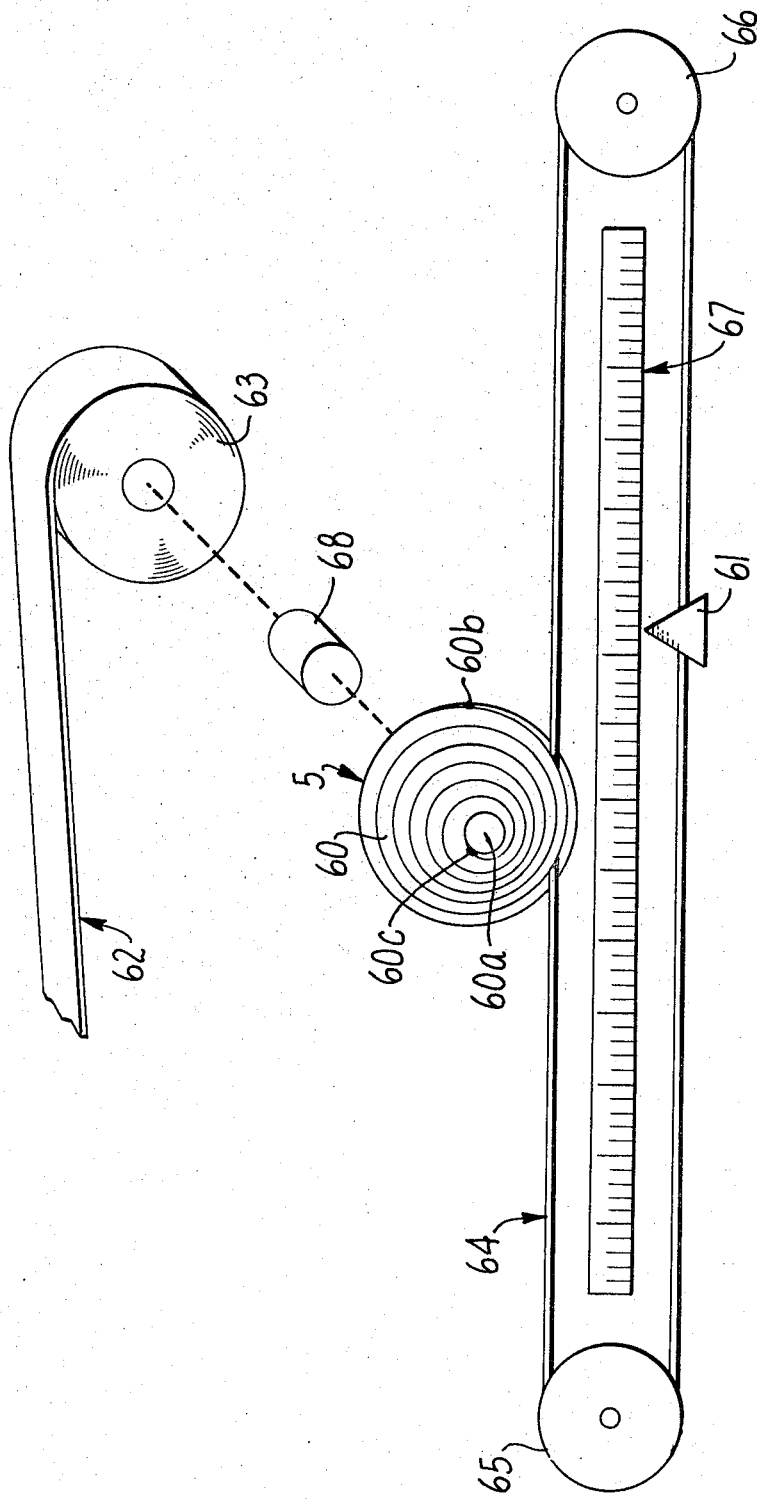

In the drawings forming a part of this application and in which like parts are identified by like reference numerals, FIG. 1 is a diagrammatic illustration of one application for the present invention in an apparatus for positioning film or tape wound on reels;

FIG. 2 is a plan view of a preferred embodiment of the invention in a mechanical analog computer device used for linearizing mechanical feedbacks in the apparatus shown in FIG. 1; and FIG. 3 is a view which illustrates a second embodiment of the invention in the use of a single spiral pulley for positioning an indicator and measuring the length of coiled material removed from a spool.

Referring to FIG. 1, a switching mechanism 10 comprises a pair of pulleys 11 and 12 interconnected by a belt 13 formed of two electrically conductive portions 13a and 13b, a nonconductive section 13c and a nonconductive tensioning spring 13d. Conductive sections 13a and 13b serve as movable contacts that engage fixed contacts 16 and 17, respectively. Depending on the rotational positions of pulleys 11 and 12, either one of the electrically conductive sections 13a and 13b or noncoductive section 13c engages a sliding contact 18. The sliding contact is also movable and is selectively positioned along an electrically conductive element 18a.

Switching mechanism 10 is incorporated in a control circuit, such as schematically shown, that energizes a motor 19 and operates a pair of clutches 20 and 21, which selectively connect a tape supply reel 22 or a take-up reel 23 to motor 19. Pulley 12 of switching mechanism 10 connects to tape reel 23 through an analog computer device 24, which maintains a linear relationship between the rate of tape movement and the rate at which belt 13 is moved by pulley 12. The need for such a device is apparent since each additional winding of tape increases the effective diameter of take-up so that the speed of tape travel increases or decreases depending on whether windings are being added or subtracted from the reels. In the past, this problem has been dealt with either by scaling the indicator to reflect the nonlinear relationship between reel displacement and tape movement or by frictionally contacting the film or tape and mechanically linking the indicator to the contact.

This invention, then, is particularly directed to the construction and application of device 24, a preferred embodiment being illustrated in FIG. 2. Device 24 essentially comprises a pair of spiral pulleys 46 and 47, each having a continuous groove beginning at a large outer diameter and terminating at a smaller inner diameter. Both pulleys are mounted on a common shaft 48 that is mechanically linked as by gearing to tape reel 23. A cord 49, such as a radio dial cord, is fastened to the outer groove of one pulley, such as at point 46a, and to the inside groove of the other pulley, as at point 47a. Cord 49 is wound such that the diameter at the point of tangential contact of both pulleys is the same. Thus, as the cord is wound onto one pulley, it is wound off the other at the same linear rate per degree of revolution, and that portion of cord 49 which is unwound from the pulleys ("outside" the pulley system) remains a constant length. The cord "outside" the pulley system is entrained around a third pulley 50 that is mechanically linked with pulley 12 of the switching mechanism. For ease of assembly, cord 49 is made in two sections, each section being initially wound on respective pulleys, and the free ends joined by a tensioning spring, not shown.

In operation, pulleys 46 and 47 are rotated in direct angular relationship to the rotation of take-up reel 23, but in nonlinear relationship to the rate of tape movement. On the other hand, the spiral windings of cord 49 are wound and unwound in linear relationship to the movement of tape T. The transformation of angular displacement of pulleys 46 and 47 into movement of cord 49 as a linear function of film or tape travel is accomplished by selecting the radial pitch of the pulleys, the gear ratio from take-up reel to pulleys, and inside and outside pulley diameter in accordance with the following relationships:

1. $K_r = K_t K_n$
2. $K_l = K_t K_n^2$, where $$K_1 = \frac{\text{length of film or tape movement}}{\text{length of cord (or switch) movement}}$$

$$K_r = \frac{\text{take-up reel O.D.}}{\text{pulley O.D.}} = \frac{\text{take-up reel I.D.}}{\text{pulley I.D.}}$$

$$K_t = \frac{\text{thickness of film or tape}}{\text{radial pitch of pulley}}$$

$$K_n = \frac{\text{turns of take-up reel}}{\text{turns of pulley}}$$

The control circuit for operating motor 19 and clutches 20 and 21 is designed to operate from an AC supply but provides a DC source for energizing a pair of solenoids 25 and 26 that operate clutches 20 and 21, respectively. The electrical circuit more particularly comprises an off-on switch 30, a momentary energizing switch 31 and a holding circuit including an SPST relay having a coil 32 which, when energized, closes normally open contacts 33.

Switching mechanism 10 operates in association with a DPDT relay having a coil 34 which, when energized, operates movable contacts 35 and 36 from points of normally closed contact 35a and 36a to points of normally open contact 35b and 36b. The position of the movable contacts 35 and 36 determines the connections made between a bridge rectifier, comprising diodes 37, 38, 39 and 40, and coils 25a and 26a of clutch operating solenoids 25 and 26. A dropping resistor 41 is employed in the connection between the bridge rectifier and solenoid coils.

Sliding contact 18 of switching mechanism 10 is mounted to an indicator 42 that may be positioned along a scale 43 having a plurality of markings 44. Each marking of the scale indicates a position that relates to a selected picture on a tape T extending between and wound around tape reels 22 and 23. Indicator 42 is accurately positioned relative to scale 43 by means of a fine hairline 45.

A typical example of operation follows.

Slide indicator 42 is positioned on scale 43 so that the hairline 45 is opposite the marking representative of a selected picture to be viewed. Movement of the indicator also causes contact 18 to slide along the electrically conductive element 18a, and if this position also places contact 18 into engagement with one of the electrically conductive sections 13a or 13b, it will condition the control circuit for energizing motor 19, and engage the appropriate clutch as will move nonconductive section 13c in the direction of contact 18. As an example, if indicator 42 is positioned to the right of that shown in FIG. 1, bringing contact 18 into engagement with the electrically conductive section 13b, and assuming on-off switch 30 is closed or "on", momentary closure of switch 31 will energize a circuit to solenoid coil 26a through switches 30-31, sliding contact 18, fixed contact 17, normally closed contacts 35a and 36a, and the bridge rectifier. In addition, a holding circuit is energized to relay coil 32, closing contacts 33. Motor 19 will then drive tape reel 23 through clutch 21, simultaneously rotating pulley 12 in a direction that moves the nonconductive section 13c toward sliding contact 18. When section 13c alone engages contact 18, the circuit energizing relay coil 32 is interrupted and contacts 33 open, deenergizing motor 19 as well as solenoid coil 26a.

Should sliding contact 18 be moved to the left and into a position that contact is made with electrically conductive section 13a, relay coil 34 is energized, reversing the movable contacts 35 and 36 and energizing solenoid coil 25a. It will be apparent that motor 19 is also energized, together with the holding circuit including coil 32. The energizing circuit for solenoid coil 25a extends from the AC power source through sliding contacts 18, electrically conductive section 13a, fixed contact 16, normally open but now closed contacts 35b and 36b, and the bridge rectifier.

FIG. 3 illustrates a second embodiment and application of the invention in a simpler form. A single spiral pulley 60 moves an indicator 61 in linear relationship to the length of material 62 as it is wound upon or unwound from a spool 63. A flexible cord 64 is wound around two pulleys 65 and 66 positioned at opposite ends of a scale 67. The two ends of cord 64 are also wound around the grooves of spiral pulley 60 so that their points of tangency are the same radial distance from the pulley axis 60a, one end of the cord being wound to the outside of the spiral pulley and secured at point 60b, the other end being wound to the inside of the pulley and secured at point 60c. Thus, as the spiral pulley 60 is turned equal lengths of cord are wound "off" and on so that the length of the unwound portion of the cord remains essentially constant.

Spiral pulley 60 also connects to spool 63 through a gear reduction box 68 which provides a fixed ratio of turn between the spiral pulley and spool.

In operation, as material 62 is wound upon or unwound from spool 63, spiral pulley 60 winds and unwinds flexible cord 64 and moves indicator 61 along scale 67. The ratio of distances travelled by measured material 62 and indicator 61 is determined by the radial pitch of the spiral pulley 60, the thickness of measured material 62 and the gear ratio in the connection between spool 63 and spiral pulley 60. This is shown by the formula $K = TN^2/P$, where $K$ is the ratio of distances travelled by the material and indicator; $T$ is the thickness of measured material; $N$ is the gear ratio between the core and spiral pulley; and $P$ is the radial pitch of the spiral pulley.

It will be further seen that the ratio K is made constant by adjusting the cord position radially on pulley 60 so that the ratio of the radius of material 62 on spool 63 to the radius of the spiral pulley 60 at the point of tangency with cord 64 is equal to TN/P, where T, N and P are the same as defined above. This relationship holds true for sheet material or any material where a single turn of the spool winds or unwinds one full layer of material. If the material is in the form of a filament, such as a wire or cable, the factor T is the material thickness divided by the number of turns required to wind one layer.

In some applications it may be difficult to extend both ends of cord 64 from spiral pulley 60 so that both contact the pulley at the same radius of tangency. In such cases, the ends of the cord may extend from differing points of tangency by compensating for the resulting difference in the amounts of cord wound on and off the spiral pulley. This may be accomplished in various ways, as by utilizing a springloaded idler pulley in lieu of either pulley 65 or 66. Compensation may also be provided by using an elastic cord 64 or providing an extension spring in the cord system. A further alternative might be to use a pair of spiral pulleys with one cord end fastened to the inside of one pulley and the other cord end fastened to the outside of the other pulley, the phase relationship of the two pulleys being adjusted so that the cord ends become tangent to the pulleys at the same radius and at the same moment of operation.

Although preferred embodiments of this invention have been illustrated and described, various modifica-

What is claimed is:

1. An analog computer device comprising means defining first and second grooved surfaces, each formed in a spiral about an axis and having substantially the same radial pitch; a flexible cord, one portion of said cord being wound around the first grooved surface, a second portion wound around said second grooved surface, and a third portion intermediate said first and second portions tangentially extending from said first and second grooved surfaces at equal radial distances from the axis of each spiral; and means rotatably mounting said means defining first and second grooved surfaces upon their spiral axes, a rotation thereof resulting in a winding up of said cord upon one grooved surface and unwinding said cord from the other grooved surface, the length of unwound cord remaining substantially constant.

2. The analog computer device of claim 1, and further comprising a scale, and means positioned by the unwound portion of said cord for indicating the length of cord wound around one of said grooved surfaces by reference to said scale.

3. The analog computer device of claim 1, and further comprising a spool of flexible material rotatably connected to said means defining said first and second grooved surfaces, the ratio of the radius of material on said spool to the radius of the grooved surfaces at their points of tangency with said cord being equal to TN/P, where T is the thickness of material divided by the number of turns required to wind one layer on said spool, N is the number of revolutions of the spool required to produce one revolution of said grooved surfaces on their spiral axes, and P is the radial pitch of each grooved surface.

4. The analog computer device of claim 1, and further comprising a pair of pulleys rotatably mounted in spaced relationship one to the other, the unwound portion of said cord being entrained around said pulleys.

5. The analog computer device of claim 1, said means defining first and second grooved surfaces comprising a pair of spiral pulleys coaxially connected upon a common axis.

6. The analog computer device of claim 1, said first and second grooved surfaces being formed as one continuous spiral, said flexible cord having one end secured in the groove at a large diameter portion of the spiral, the other end of said cord being secured in the groove at a small diameter portion of said spiral.

7. The analog computer device of claim 1, and means for rotating said means defining first and second grooved surfaces upon their spiral axes including a spool of flexible material and gear reduction mechanism for rotating the grooved surfaces at a lesser angular rate than said spool.

8. An analog computer mechanism comprising a pair of substantially identical spiral pulleys, a cord wound around said spiral pulleys, one end of said cord being secured at the large diameter groove of one pulley, the other end being secured at the small diameter groove of the other pulley, said cord being wound around said pulleys such that the diameter at the point of tangential contact of both pulleys is substantially the same, said cord including a section between pulleys that remains a constant length as the cord is wound onto one pulley and off the other pulley, the convolutions of said pulleys being formed to linearize the rate at which the cord is wound around said pulleys or unwound therefrom with respect to the rate at which a strip of tape or film is wound or unwound from a reel.

9. The analog computer mechanism of claim 8, and further comprising a reel for winding a strip of tape or film thereon, said spiral pulleys being connected to rotate with said reel and constructed in accordance with the relationship $K_r = K_t K_n$, where:

$$K_r = \frac{\text{reel O.D.}}{\text{pulley O.D.}} = \frac{\text{reel I.D.}}{\text{pulley I.D.}},$$

$$K_t = \frac{\text{thickness of film or tape}}{\text{radial pitch of pulley}},$$

and $$K_n = \frac{\text{turns of reel}}{\text{turns of pulley}}$$

* * * * *

UNITED STATES PATENT OFFICE
CERTIFICATE OF CORRECTION

Patent No. 3,850,384      Dated November 26, 1974

Inventor(s) Lyle Gilbert Priest

It is certified that error appears in the above-identified patent and that said Letters Patent are hereby corrected as shown below:

Column 1, line 14, after "length measuring" insert -- apparatus --. Column 4, line 18, "and on so" should read -- and "on" so --.

Signed and sealed this 21st day of January 1975.

(SEAL)
Attest:

McCOY M. GIBSON JR.
Attesting Officer

C. MARSHALL DANN
Commissioner of Patents